Nov. 26, 1935.  T. J. SMULSKI  2,022,441
ELECTRIC INDICATING INSTRUMENT
Original Filed May 18, 1931
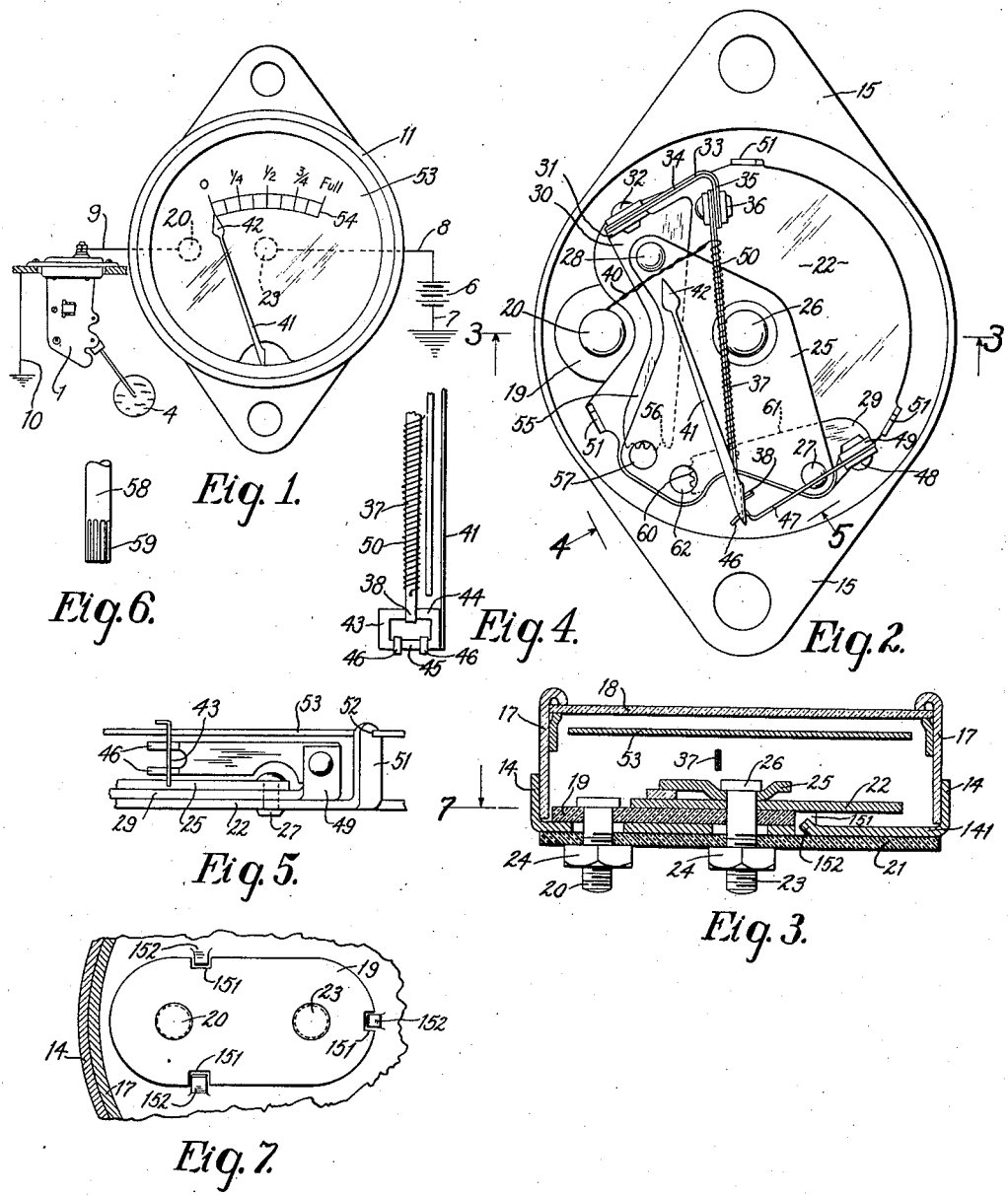
INVENTOR.
Theodore J. Smulski.
BY Slough and Canfield
his ATTORNEYS.

Patented Nov. 26, 1935

2,022,441

UNITED STATES PATENT OFFICE 2,022,441

ELECTRIC INDICATING INSTRUMENT

Theodore J. Smulski, Gary, Ind., assignor to The Anderson Company, Gary, Ind., a corporation of Indiana Original application May 18, 1931, Serial No. 538,152. Divided and this application December 14, 1933, Serial No. 702,342

18 Claims. (Cl. 171—95)

This invention relates to indicating instruments of the class in which an indicating receiver portion of the instrument, or indicator, is electrically actuated by a remotely disposed actuating portion of the instrument, or actuator, the two portions of the instrument being interconnected by a suitable electric circuit.

This invention relates more particularly to the receiver portion of such dual instrument, commonly referred to as receivers, and to receivers of this class responsive to effect an indication or registration commensurable with variations of electric current transmitted thereto.

This application is divisional from my co-pending application Serial No. 538,152, filed May 18, 1931, for Improvements in electrical indicating instruments. In that application, is illustrated and described both an actuator or current transmitter and a receiver or indicator. Reference may be had thereto for a complete description of an actuator of the type adapted to transmit current impulses over an electric circuit to a receiving instrument, the impulses being of variable duration in correspondence with variations of a variable factor such as movements of a mechanism element movable over a range of movement.

While the instrument of this application is divisional from the above-mentioned application, and is therefore particularly applicable to be actuated by current impulses transmitted to it, it will appear hereinafter that the instrument of the instant application may be applied to other uses, for example to uses in which it is desired to indicate variations of continuously flowing current as distinguished from impulses of current.

It is therefore an object of this invention to provide an improved indicating instrument of the class adapted to be energized by variable electric current.

Another object is to provide an improved indicating instrument of the class adapted to be thermally energized by a succession of electric current impulses.

Another object is to provide an improved thermally responsive indicating instrument.

Another object is to provide an improved indicating instrument responsive thermally to variable electric current or to a succession of electric current impulses.

Another object is to provide a thermally actuated indicating instrument having improved means for compensating for changes of ambient temperature.

Another object is to provide an indicating instrument having improved means for adjusting an indicating needle of the instrument to a scale thereof to correct for variations in manufacture and assembling the parts thereof.

Another object is to provide an indicating instrument of the class just described which will be thermally responsive to electric current.

Another object is to provide, in an indicating instrument, comprising a needle and a scale relatively movable, improved means for adjusting the needle to the scale.

Another object is to provide, in an indicating instrument, comprising a scale and a needle relatively movable, improved means for adjusting the needle to each extreme end of the scale independently.

Other objects will be apparent to those skilled in the art to which my invention appertains.

My invention is fully disclosed in the following description taken in connection with the accompanying drawing, in which:

Fig. 1 is a front elevational view to an enlarged scale of an embodiment of my invention;

Fig. 2 is a view similar to Fig. 1 to a still larger scale and with certain covering parts thereof removed to show the interior mechanism;

Fig. 3 is a cross-sectional view taken approximately from the plane 3—3 of Fig. 2, and with parts back of the section plane omitted for simplicity;

Fig. 4 is a fragmentary elevational view taken from the plane 4 of Fig. 2;

Fig. 5 is a fragmentary view taken from the plane 5 of Fig. 2;

Fig. 6 is a fragmentary view of an adjusting tool which I may employ in connection with the mechanism shown in Fig. 2;

Fig. 7 is a fragmentary view taken from the plane 7 of Fig. 3.

Referring to the drawing, I have shown at 11 generally an instrument embodying my invention. In the preferred practice of my invention the instrument 11 is energized and rendered responsive to a succession of electric impulses transmitted thereto over a circuit, one form of which is shown in Fig. 1, the impulses being produced by a transmitter or actuator 1. Current may flow over the circuit from a battery 6 to ground 7 and from a ground 10 to the actuator 1, and thence by wire 9 to the instrument and by wire 8 from the instrument back to the battery. The current in the circuit may be interrupted to produce impulses therein by the actuator 1.

The actuator 1 may be of any suitable construction and responsive to any variable factor to produce impulses of variable duration. One form of actuator is completely illustrated and described in the above-mentioned application from which the instant application is divisional and reference may be had thereto. In that case, the actuator 1 is provided with a float 4 and the actuator and float are projected into a tank containing liquid such as gasoline upon a motor vehicle, and the positions of the float 1 corresponding to changes of liquid level in the tank cause the actuator to transmit impulses of correspondingly varying duration to the instrument 11 so that the instrument will indicate the quantity of liquid in the tank.

Where the actuator 1 is responsive to other variable factors such as a variable pressure or a variable velocity, etc., the instrument correspondingly will indicate such pressure, velocity, etc.

The instrument 11 comprises a main base 141, preferably press-formed from sheet metal, generally of shallow cup form having side walls 14 to which may be attached, or integrally with which may be formed, ears 15—15 by which the instrument as a whole may be attached to a supporting panel 16 (not shown), such for example as the instrument panel of a motor car.

The instrument is covered and sealed and protected by an inverted cup-like cover 17 pressformed from sheet metal, the bottom 18 of which is preferably a transparent window secured in the cover 17 in any suitable or well known manner.

A plate of insulating material 19 is bolted to the base 13 by a terminal connection bolt 20 projected through a suitable perforation in the plate 19 and in the base 141.

A sub-base 22 of sheet metal is clamped upon the insulating plate 19 by a second terminal bolt 23 through a suitable perforation in the base 22 and in the plate 19.

The perforations in the plate 19 substantially fit the bolts 20 and 23 and the perforations in the base 141 are larger than the bolts and the bolts are maintained at the centers of the latter perforations to space them from and to insulate them from the base by suitably fixing the plate 19 against laterally shifting in the base. This is preferably accomplished by providing the plate 19 with notches 151—151 into which tongues 152—152, pressed upwardly from the base 141, project. To further insulate the bolts 20 and 23 and their nuts 24 from the base 141, an insulating plate 21 is placed on the outside of the base 141 and held in place by the nuts 24.

A carrier plate 25 is mounted on the sub-base 22, the bolt 23 being projected through a suitable perforation thereof at the central portion of the sub-base 22 and rivets 27 and 28 being projected through the plate 25 and through the sub-base 22 at radially spaced distances from the central portion of the base 22. At the central portion referred to, the carrier plate 25 is clamped directly upon the sub-base 22 by the head 26 of the bolt 23, but at the rivets 27 and 28 the carrier plate 25 is spaced from the sub-base 22 by suitable bent portions of the plate 25 and lying between the plate and the sub-base at these portions, and pivotally mounted on the rivets 27 and 28 respectively are adjustable supports 29 and 30, the rivets 27 and 28 providing rotational bearings for adjusting movements of the supports 29 and 30, and the sub-base 22 and plate 25 between which the supports are disposed, serving to maintain them in planes substantially parallel to the sub-base 22.

Preferably, the rivets 27 and 28, which extend through the carrier plate 25 and sub-base 22 as will be understood, and as shown for the rivet 27 in Fig. 5, are drawn sufficiently tight to prevent shifting of the supports 29 and 30 except upon the application of considerable force to adjustably move the supports. The three-point engagement, namely by means of the bolt 23, and the rivets 27 and 28, between the plate 25 and sub-base 22, prevents relative rotational or lateral displacement of one relative to the other.

The adjustable support 30 is preferably formed from flat sheet metal and is of generally elongated shape, and at an end thereof adjacent the rivet 28 is provided with an upturned lug 31 to which is riveted as at 32, a flat strip of bimetal 33 extending from the lug 31 rectilinearly for a predetermined distance in a compensating portion 34, at the end of which portion the bimetal 33 is bent at an angle into an attaching portion 35 to which is riveted as at 36 a bimetal actuator 37 extending from the rivet 36, which is disposed substantially at one diametrical side of the sub-base 22, to the other side of the base where it terminates in a hook 38. The actuator 37 has wound thereon an insulated heating wire one terminal of which is grounded on the actuator 37 and the other end of which connects by a winding 50 to the terminal bolt 20.

An indicating needle 41 is pointed at one end as at 42 and at the opposite end is formed with or has secured thereto a loop 43 disposed in a plane at right angles to the plane in which it is desired that the needle 41 shall swing. A portion 44 of the loop is looped over the hook 38 of the bimetal actuator 37. An opposite portion 45 of the loop is looped over a pair of hooks 46—46 formed on the end of a flat metal spring 47, linearly disposed at an angle to the direction of the bimetal actuator 37 and at the end opposite the hooks 46 being riveted as at 48 to a lug 49 formed on the adjusting support 29 at a portion thereof adjacent the rivet 27.

The tension of the spring 47 normally pulls longitudinally on the bimetal actuator 37 through the loop 43 and is sufficient to support the needle 41 by its loop 43. When current flows in the heating winding 50, in a manner to be described, it heats the winding and the actuator 37 causing the latter to warp or bend counter-clockwise as viewed in Fig. 2, around its end at the rivet 36, thus moving the hook 38 relative to the hooks 46 and swinging the needle 41 clockwise as viewed in Fig. 2 around the hook 46.

The sub-base 22 is provided with a plurality such as three posts 51—51 upon which, or in suitable notches formed therein, see Fig. 5, at 52, a dial 53 is mounted and disposed in a plane between the needle 41 and the bimetallic actuator 37. The dial 53 may be large enough in diameter to entirely conceal all of the mechanism above described except the needle 41 itself, the disposition of the dial, needle and actuator being indicated in Fig. 5.

The dial 53 may be provided with a scale 54 with which the needle point 42 may cooperate, and in cases in which the instrument is employed to indicate the level of liquid in a tank as has been referred to, the scale 54 may be calibrated in terms of tank-contents.

As will now be understood, the needle 41 will take up a position on the scale 54 in accordance with the temperature of the bimetal actuator 37 communicated thereto by the heat of electric current in the winding 50. In order to compensate for variations in the manufacture and assembling of the parts heretofore described, the mechanism is adjustable to bring the needle point 42 to zero on the scale when the bimetal actuator 37 is not heated, and to cause the needle to indicate at the opposite extreme end of the scale at a predetermined temperature of the actuator 37. To this end, the adjustable support 30 may be forcibly and by very small increments rotated around the rivet 28, which will cause the hook 38 of the bimetallic actuator 37 to move on a circular arc around the rivet 28. The rivet 28 is so disposed that the adjusting movement of the hook 38 will be generally in the direction at right angles to the needle 41 when adjacent its zero position so that the maximum of adjusting movement of the needle will be effected by the minimum of adjusting movement of the bimetallic actuator 37. To move the adjustable support 30 accurately and by small increments and to readily overcome the friction of the rivet 28 when said friction is made great to prevent accidental loss of adjustment, the support 30 has an elongated portion 55 extending beyond the rivet 28 and terminating in a row of gear teeth 56 concentric with the rivet 28; and a perforation 57 is provided in the carrier plate 25 through which the end of a tool 58, shown separately in Fig. 6, may be inserted. The tool 58 is provided with teeth 59 adapted to mesh with the teeth 56, and upon insertion of the tool 58 in the perforation 57 and rotating the same, the support 30 may be rotated with a micrometer movement around the rivet 28 in a well known manner.

The throw of the needle 41 for a given temperature of the actuator 37 may be varied as will be understood by the tension of the spring 47; and the tension of the spring may be adjusted by rocking the support 29 around its rivet 28, the latter operation being effected by means of gear teeth 60 on the end of an extension 61 of the support 29 and the tool 58 inserted in a perforation 62 in the carrier plate 25. Upon adjustably rotating the support 29, in this manner, the hook 46 of the spring 47 may be moved generally in the longitudinal direction of the bimetallic actuator 37, which adjustment has little or no tendency to change the position of the needle 41. Thus the two adjustments of the needle 41 just described may be made independently of each other.

The foregoing adjustments are made at the time of manufacturing the indicating instrument and may be described as adjusting the needle 41 to the scale 54 for normal or average conditions.

To cause the indications on the scale to correspond to changes of level in the tank of liquid, the current, or in the case of current impulses, the impulses transmitted to the instrument from the actuator 1, may be adjustably varied at the actuator and this is fully described in the above-mentioned co-pending application to which reference may be had.

The general operation of my invention, electrically considered, will now be described.

Current flowing to the instrument 11 from the actuator 1, see Fig. 1, by wire 9 to the instrument 11 entering the instrument by terminal bolt 20 and going by wire 40 through the heating winding 50 and thence through the actuator 37 to the carrier plate 25, sub-base 22 and terminal bolt 23 whence by wire 8 it returns to the battery 6.

The current heats the winding 50 of the indicating instrument, causing the bimetallic actuator 37 to bend an amount corresponding to the amount of heat energy supplied to it, which in turn causes the needle 41 to take up a definite corresponding position on the scale 54.

If the impulses are relatively short in duration, the needle 41 will indicate a point not far from zero and vice versa if the impulses are of longer duration. The duration of the impulses is determined in the actuator 1 by the level of liquid in the tank as above described.

The indicating instrument is compensated for changes of ambient temperature by the following means. As stated hereinbefore, the two metals of the bimetallic element 37 are disposed so that upon an increase of temperature, the hook 38 on the lower end of the element moves counter-clockwise around the point 36. Therefore, an increase of ambient temperature will effect such a movement of the element 37. The two metals of the bimetallic strip 33 are so disposed that, upon an increase of temperature thereof, the portion 34 thereof bends downwardly and communicates its movement to the actuator 37, tending to move the hook 38 clockwise around the point 32. The element 33 is so proportioned with respect to the actuator 37, as to effective length and responsiveness to temperature changes, so that the movement of one is neutralized by the movement of the other and the hook 38 remains substantially unmoved by changes of ambient temperature.

The above described compensation I have found to be sufficient without additional adjusting means for changes of ambient temperature when the instrument is in open circuit condition. However, I have found in practice that when the instrument is in use and the winding 50 on the actuator 37 is energized by electric current, a decrease in ambient temperature will effect a small percentage of increase of the reading on the scale when the needle 41 is indicating on the upper portions of the scale. To adjustably correct for this variation, the tension in the spring 47 may be increased adjustably, as hereinbefore described. This will have the effect of correcting for the increase of the reading on the upper portions of the scale because it will tend to move the hook slightly clockwise, and furthermore, at zero reading, which is unaffected by the said decrease of ambient temperature, the said increase of tension in the spring 47 will not influence the position of the needle because the direction of the force from the spring 47 is in the line of the actuator 37.

Thus for changes of ambient temperature on either open circuit or on closed circuit operating conditions, the instrument is compensated, or may be adjustably compensated, for changes of ambient temperature.

The above described variation of the reading upon change of ambient temperature, that is to say, when the instrument is in the closed circuit condition, and is receiving current impulses, may be compensated for, by the following alternative method. The winding 50 on the bimetallic actuator 37 may be made with wire of a kind having a negative temperature coefficient of resistance. Then, upon the occurrence of a decrease of ambient temperature, which as above mentioned I have found by experiment, causes an increase in the reading; the resistance of the winding will be increased resulting in a corresponding diminution of the current flowing and a diminution of the heat generated thereby, and a reduction in the degree of bending of the actuator 37 thus neutralizing the increase of the reading referred to.

My invention is not limited to the exact details of construction shown and described. Many changes and modifications may be made within the scope and spirit of my invention without sacrificing its advantages.

I claim:

1. In an indicating instrument, a base, an indicating needle movably supported on the base, a thermally responsive element for moving the needle, a support for the thermally responsive element movably mounted on the base, means for moving the support to adjust the position of the thermally responsive element to adjust the position of the needle, the moving means comprising a tool receptacle associated with the base in which a toothed tool may be rotated and gear teeth on the support meshable with teeth of the tool.

2. In an indicating instrument, a main base, an indicating needle movably supported on the base, a thermally responsive element for moving the needle, a support for the thermally responsive element pivoted on the base, means for adjustably moving the support to adjust the position of the thermally responsive element to correspondingly adjust the position of the needle, said means comprising a tool receptacle associated with the base in which a tool may be rotated and a portion of the support engageable with a tool in the receptacle and adapted to be propelled upon rotation of the tool.

3. In an indicating instrument, a main base, an indicating needle movably supported on the base, means for indicatingly moving the needle, a spring associated with the base and with the needle to oppose movement of the needle, the axis of movement of the spring being substantially spaced from the needle axis, a support for the spring, movably mounted on the base, means for moving the support with a micrometer movement to adjust the tension of the spring, the means comprising a tool receptacle associated with the base in which a rotatable tool may be rotated as in a bearing, and a portion of the support engageable with the tool and adapted to be propelled thereby upon rotation of the tool.

4. In an indicating instrument, a main base, an indicating needle movably supported on the base, means for indicatingly moving the needle, a spring for opposing movement of the needle and supportingly engaging the same, a support for the spring pivotally mounted on the base, means for rotating the support with a micrometer movement to adjust the tension of the spring to adjust the range of the needle, the means comprising a tool receptacle associated with the base in which a toothed tool may be rotated and gear teeth on the support meshable with teeth of the tool.

5. In an indicating instrument, a main base, an indicating needle movable relative to the base, a thermally responsive element connected to the needle for moving it in response to changes of temperature of the element, a spring connected to the needle opposing its movement, a support for the element and a support for the spring each pivotally mounted on the base, means for moving the support with micrometer movement to respectively adjust the needle to its zero position and to adjust the range of movement thereof, comprising a portion on each support concentric with its pivot and remote therefrom, a pair of tool receptacles associated with the base and each adjacent to one of said portions of the support, said portions being adapted to be propellingly engaged by a rotatable tool rotated in the receptacles.

6. In an indicating instrument, a base, an indicating needle movably supported on the base, a thermally responsive device for moving the needle, comprising a bendable bimetal element connected to the needle at one portion of the element to move the needle and forming a support for the same and provided with a heating winding for heating the element, and a second bimetal element connected to and supporting the first element at one portion and to the base at another portion and extending in a direction generally parallel to the direction of movement of the needle moving portion of the first bimetal element.

7. In an indicating instrument, a base, an indicating needle, a thermally responsive device for moving the needle and compensated for changes of ambient temperature comprising a bimetal bendable strip supportingly connected to the needle at one end of the strip for moving the needle in response to temperature changes of the element, a winding associated with the element for changing its temperature, a second bimetallic strip connected at one end to and supporting the other end of the first bimetal strip, and at its other end connected to the base, and extending in a direction generally parallel to the direction of movement of the end of the first metal strip at its connection point with the needle.

8. In an indicating instrument, a base, an indicating needle movably supported on the base, a thermally responsive element for moving the needle, a normally immovable support for the thermally responsive element movably mounted on the base, means for moving the support to adjust the position of the thermally responsive element to adjust the position of the needle, and means for maintaining the support in any adjusted position.

9. In an indicating instrument, a main base, an indicating needle movably supported on the base, means for indicatingly moving the needle, resilient means associated with the needle to oppose movement thereof, a support for the resilient means movably mounted on the base, the point of support of the resilient means being spaced from the needle axis of rotation, means for moving the support adjustably to adjust the tension of the resilient means, and means for maintaining the support in any adjusted position.

10. In an indicating instrument, a main base, an indicating needle movably supported on the base, a thermally responsive element associated with the needle for moving it in response to changes of temperature of the element, resilient means opposing movement of the needle, a support for the element and a support for the resilient means pivotally frictionally mounted on the base, means for moving the supports adjustably to respectively adjust the needle to its zero position and to adjust the range of movement thereof, and the pivot friction maintaining the supports respectively in any adjusted position.

11. In an indicating instrument, a main frame, a movable indicating arm having a pair of spaced confronting knife edge bearing portions, an actuating element supported on the frame having a concaved movable portion rockingly engaging one knife edge portion of the arm, a second element having a second concaved portion rockingly engaging the other knife edge portion of the arm, means for resiliently tending to separate the concaved portions to maintain them in engagement with the knife edge portions, electro-responsive means for moving the actuating element concaved portion to move the indicating arm, and means to adjust the tension of the resilient means comprising a support for the second element and resilient means on the main frame adjustably movable thereon and means to maintain it in any adjusted position.

12. An indicating instrument as described in claim 11 and in which the support for the second element and resilient means is frictionally pivotally connected to the main frame and is pivotally adjustably movable and the friction maintains it in any adjusted position.

13. In an indicating instrument, a main frame, a movable indicating arm having a pair of spaced confronting knife edge bearing portions, an actuating element supported on the frame having a concaved movable portion rockingly engaging one knife edge portion of the arm, a second element having a second concaved portion rockingly engaging the other knife edge portion of the arm, means for resiliently tending to separate the concaved portions to maintain them in engagement with the knife edge portions, electro-responsive means for moving the actuating element concaved portion to move the indicating arm, and means to adjustably position the indicating arm comprising a support on the main frame for the actuating element adjustably movable thereon and means to maintain it in any adjusted position.

14. An indicating instrument as described in claim 13 and in which the support for the actuating element is pivotally frictionally connected to the main frame and is adjustably pivotally movable and the friction maintains it in any adjusted position.

15. In an indicating instrument, a base, a movable indicating needle, a thermally responsive element mounted on the base for moving the needle, a resilient element mounted on the base opposing movement of the needle, the thermally responsive element and the resilient element jointly supporting the needle, and the thermally responsive element and the resilient element being mounted on movable supports manually movable to adjust the needle position.

16. In an indicating instrument, an indicating needle having a pair of spaced pivots thereon, a resilient element pivotally connected to the needle at one pivot and exerting resilient thrust on the needle generally in the direction of the two pivots, a thermally responsive element having a portion pivotally connected to the needle at the other pivot, resisting the thrust of the resilient element and thermally responsive to move the said other pivot in a direction transversely of the two pivots to move the needle.

17. In an indicating instrument, an indicating needle having a pair of spaced pivots associated therewith, a resilient element having pivotal connection with the needle at one of said pivots and exerting resilient thrust thereon generally in the direction of the two pivots, a thermally responsive element having a portion having a pivotal connection with the needle at the other said pivot opposing the thrust of the resilient element and thermally responsive to move the said other pivot in a direction generally transversely of the two pivots, the needle being supported by its pivots and movable by the thermostat.

18. In an indicating instrument, a base, an indicating needle having a pair of spaced pivots thereon, a spring supported by the base at one portion and at a spaced portion therefrom transversely movable thereof and connected to the needle at one pivot, and exerting resilient thrust on the needle generally in the direction of its two pivots, a bi-metallic element supported at one end portion on the base and at a free end portion pivotally connected to the needle, resisting at its pivot connection with the needle, the thrust of the spring, and thermally responsive to move the said other pivot, in a direction generally transversely of the two pivots.

THEODORE J. SMULSKI.